United States Patent [19]
Frank

[11] Patent Number: 5,220,640
[45] Date of Patent: Jun. 15, 1993

[54] NEURAL NET ARCHITECTURE FOR RATE-VARYING INPUTS

[75] Inventor: Mark Frank, Chandler, Ariz.

[73] Assignee: Motorola, Inc., Schaumburg, Ill.

[21] Appl. No.: 585,468

[22] Filed: Sep. 20, 1990

[51] Int. Cl.$^5$ .......................... G10L 5/04; G10L 5/00
[52] U.S. Cl. .......................... 395/2; 381/45; 395/22
[58] Field of Search ............... 381/41, 43, 46, 47, 381/45; 364/513.5; 395/2.41

[56] References Cited

U.S. PATENT DOCUMENTS

| | | | |
|---|---|---|---|
| 4,406,001 | 9/1983 | Klasco et al. | 369/88 |
| 4,852,170 | 7/1989 | Bordeaux | 381/41 |
| 4,885,791 | 12/1989 | Fujii et al. | 381/43 |
| 4,933,973 | 6/1990 | Porter | 381/43 |
| 4,982,433 | 1/1991 | Yajima et al. | 381/49 |
| 5,053,974 | 10/1991 | Penz | 364/513 |

OTHER PUBLICATIONS

Glover, D. E., "An Optical Fourier/Electronic Neurocomputer Automated Inspection System" Proc. IEEE Intl. Conf. on Neural Networks, 1988, 569–576.
Kohonen, T., "The Neural Phonetic Typwriter", Computer, Mar. 1988, pp. 11–22.
Hammerstrom, D., "A VLSI Architecture for High-Performance, Low Cost, On-Chip Learning", Feb. 1990.
Park et al., "A Novel Structure for Real-Time Digital Sample-Rate Converters with Finite Precision Error Analysis" 1991, pp. 3613–3616.
Hecht-Nielsel, "Neurocomputing: picking the human brain", IEEE Spectrum, Mar. 1988, pp. 36–41.
Gevarter, W. B., Artificial Intelligence Expert Systems Computer Vision and Natural Language Processing, Noyer Publications, 1984, 127–133.
Rabiner et al., Digital Processing of Speech Signals, Prentice-Hall, 1978, 26–31.

*Primary Examiner*—Michael R. Fleming
*Assistant Examiner*—Robert W. Downs
*Attorney, Agent, or Firm*—Joe H. Barbee

[57] ABSTRACT

A neural net architecture provides for the recognition of an input signal which is a rate variant of a learned signal pattern, reducing the neural net training requirements. The duration of a digital sampling of the input signal is scaled by a time-scaling network, creating a multiplicity of scaled signals which are then compared to memorized signal patterns contained in a self-organizing feature map. The feature map outputs values which indicate how well the scaled input signals match various learned signal patterns. A comparator determines which one of the values is greatest, thus indicating a best match between the input signal and one of the learned signal patterns.

7 Claims, 2 Drawing Sheets

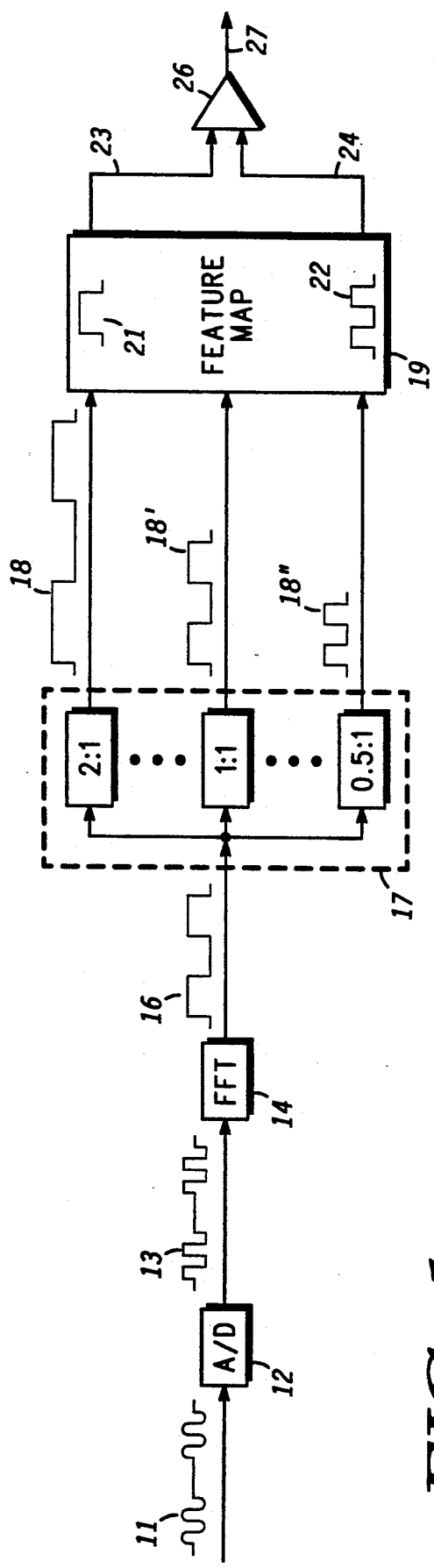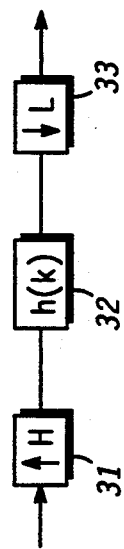
FIG. 1
FIG. 2

NEURAL NET ARCHITECTURE FOR RATE-VARYING INPUTS

BACKGROUND OF THE INVENTION

The present invention relates, in general, to neural net architecture, and more particularly, to a neural net architecture which minimizes training time by enabling a feature map to recognize input signals that are rate variants of a previously learned signal pattern.

Advancements in neural net architecture have made neural nets the technology of choice for such advanced artificial intelligence applications as speech recognition and real-time handwriting recognition. Such advanced functions as speaker verification and signature verification may potentially be implemented using neural nets. There are, however, many problems to be overcome in these areas, not the least of which is the rate at which a speaker speaks, or a writer writes.

In the past, speech and handwriting recognition were approached in a number of ways. Dynamic Programming, described by Silverman, H. F., and Morgan, D.P., "The Application of Dynamic Programming to Connected Speech Recognition", IEEE ASSP Magazine, July 1990, pp 6–25, was a statistical approach which relied upon forward search with back-tracking to determine the probability that a given input corresponded to a certain pattern. Dynamic Programming was further refined using Hidden Markov Models as described by Picone, Joseph, "Continuous Speech Recognition Using Hidden Markov Models", IEEE ASSP Magazine, July 1990, pp 16–41. These were software implementations which required a long time to train to recognize varied inputs. Another approach was described by Tank, D. W., and Hopfield, "Concentrating Information in Time: Analog Neural Networks with Applications to Speech Recognition Problems", Procedures of the IEEE Conference on Neural Networks, San Diego, Jun. 21-24, 1987, pp IV455–IV468. Though this work demonstrated the applicability of neural nets to speech recognition, a practical application of the approach required a vast commitment of hardware. The prewired analog nets could only recognize the exact pattern for which they were wired. In order to overcome this shortcoming, additional circuitry for every possible variation of each input had to be added.

Advances in digital implementations of neural networks used less hardware than required by the Tank and Hopfield approach. However, the need for a feature map with a memorized pattern for each potential input limited the ability of the system to recognize variants in speaking rates. It was necessary to train the system to recognize each new input rate as it was encountered. This became very time consuming. Also, the feature map, and thus the memory requirements of the system, quickly multiplied to unwieldy proportions.

SUMMARY OF THE INVENTION

The objects and advantages of the present invention are provided by a neural net architecture which provides for the recognition of an input signal which is a rate variant of a learned signal pattern. The duration of a digital sampling of the input signal is scaled by a time-scaling network, creating a multiplicity of scaled signals which are then compared to memorized signal patterns contained in a self-organizing feature map. The feature map outputs values which indicate how well the scaled input signals match various learned signal patterns. A comparator determines which one of the values is greatest, thus indicating a best match between the input signal and one of the learned signal patterns.

BRIEF DESCRIPTION OF THE DRAWINGS

FIG. 1 is block diagram illustrating an embodiment of the present invention;

FIG. 2 is a block diagram of a time-scale circuit which may be used as a part of the present invention;

DETAILED DESCRIPTION OF THE DRAWINGS

Figure 3:
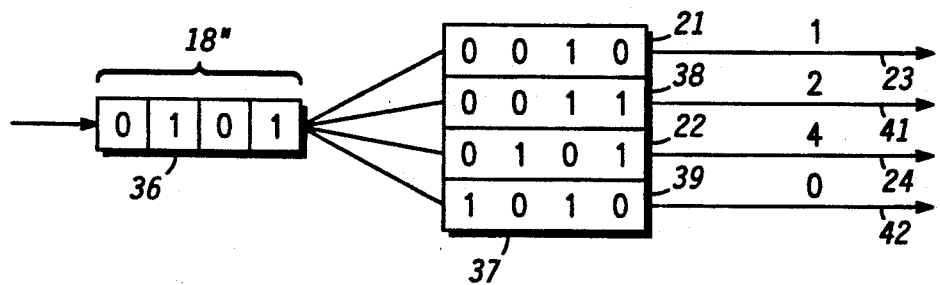
FIG. 3 is a simplified illustration of a feature map with a delay line which may be used as a part of the present invention.

FIG. 1 is a block diagram of the present invention as applied to speech recognition. Analog input signal 11 is sampled by analog-to-digital (A/D) converter 12, creating a digital image of input 11, represented in FIG. 1 by signal 13. Signal 13 as output by A/D converter 12 is a multi-bit signal, typically of eight to sixteen bits. In the case of speech recognition, signal 13 is passed through fast Fourier transform circuit 14 to transform signal 13 from the time domain to the frequency domain as represented by signal 16. The output of fast Fourier transform circuit 14 is a multi-channel, multi-bit signal, with each channel representing a range of frequencies found in input signal 11. Signal 16, then represents a family of outputs which describe the frequency characteristics of input signal 11.

Time-scale section 17 expands and compresses the duration of signal 16 by a set of ratios. Multiple signals 18, 18' and 18", each representing signal 16 lasting for a differently scaled duration, are passed to feature map 19. The object is that input signal 11 may represent a certain phoneme, such as "a". Neural net feature map 19 has been trained to recognize learned pattern 21 as phoneme "e" and learned pattern 22 as phoneme "a". Learned pattern 22 is similar to signal 16, except that signal 16 resulted from phoneme "a" being spoken more slowly than when the neural net was trained, establishing learned pattern 22 as a recognizable "a". Signal 16 will thus not be recognized as an "a". Instead of presenting signal 16 to feature map 19, time-scaled signals 18, 18' and 18" are presented sequentially. The ratios shown are examples only, and are not to be construed as constraints as to the ratios attainable. Ideally, the more differently ratioed signals 18, 18' and 18" that are output by time-scale section 17, the greater the opportunity for feature map 19 to recognize a signal. Ratios of 2:1 and 0.5:1, however, do present practical upper and lower limits to the amount of scaling that can be realized without loss of fidelity to signal 16.

As each signal 18, 18' and 18" is presented to feature map 19, feature map 19 outputs a value which represents how well each signal 18, 18' and 18" matches each learned pattern. Since none of the signals 18, 18' or 18" match learned pattern 21 well, output 23 will be relatively low. On the other hand, there is a good match between signal 18" and learned pattern 22. Thus output 24 will be relatively high. Comparator 26 examines the relative values of outputs 23 and 24, recognizes output 24 as the highest, and indicates this fact with output 27, establishing input 11 as being recognized as the phoneme "a".

FIG. 2 illustrates the operation of time-scale section 17. The duration of digital input signal 16 of FIG. 1 is expanded by a factor "H" by artificially adding data samples by means of interpolator 31. The output of interpolator 31 is smoothed by low-pass filter 32. The duration of the output of low-pass filter 32 is compressed by a factor "L" by removing data samples by means of decimator 33. The net scaling is then H/L. The operation of time-scaling circuit 17 is described in detail by Crochiere, R. E. and Rabiner, L. R., *Multirate Digital Signal Processing*, Prentice-Hall, New Jersey, 1983, pp 39–42, and by Rabiner, L. R. and Schafer, R. W., *Digital Processing of Speech Signals*, Prentice-Hall, New Jersey, 1978, pp 27–30, which descriptions are hereby incorporated herein by reference.

FIG. 3 illustrates the use of a delay line in conjunction with the feature map to perform pattern recognition. Signal 18" is clocked into multistage delay line 36. Signal 18", now held in delay line 36, is then compared to learned patterns in feature map segment 37. Note that one bit of learned pattern 21 matches signal 18'. Output 23 reflects this fact. Learned pattern 38 matches two bits of signal 18", and output 41 is appropriately weighted. Learned pattern 22 is the closest match, with output 24 reflecting a four-bit match. Finally output 42 indicates the lack of any matching bits between learned pattern 39 and signal 18". Recall that signal 18" is a multi-channel, multi-bit signal. The binary representation used herein is not to be construed as a limitation, but is used as an illustrative example only.

Figure 4:
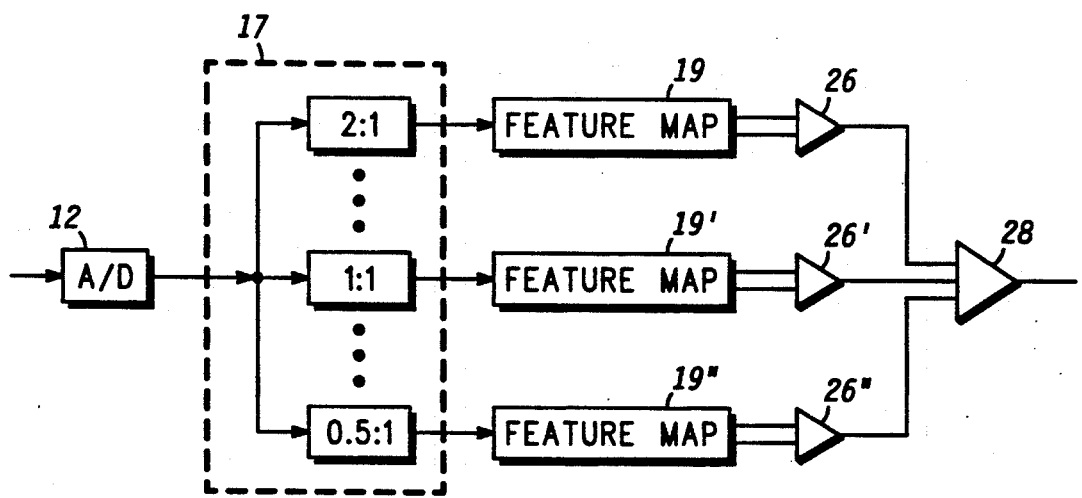
FIG. 4 is a block diagram of an alternate embodiment of the present invention.

FIG. 4 illustrates an alternate embodiment of the present invention, highlighting two specific features. The first is that fast Fourier transform circuit 14 is eliminated. In an application such as real-time handwriting recognition, frequency variations are not a factor as in speech recognition, and the transformation from the time domain to the frequency domain is not necessarily appropriate. The second feature illustrated by FIG. 4 is a trade off between hardware and speed. Separate identical feature maps 19, 19" and 19" are utilized to look at each of the outputs of time-scale section 17. Thus the comparisons of each one of signals 18 to the learned patterns of the feature map are accomplished in parallel, greatly enhancing the speed of the neural net. The outputs of feature maps 19, 19' and 19" are compared by comparators 26, 26' and 26", respectively. A final decision as to the best match is then made by comparator 28.

By now it should be apparent that an improved neural net architecture has been provided which provides for the recognition of an input signal which is a rate variant of a learned signal pattern. The duration of a digital sampling of the input signal is scaled by a time-scaling network, creating a multiplicity of scaled signals which are then compared to memorized signal patterns contained in a self-organizing feature map. The feature map outputs values which indicate how well the scaled input signals match various learned signal patterns. A comparator determines which one of the values is greatest, thus indicating a best match between the input signal and one of the learned signal patterns. The training requirements for the neural net feature map are thereby greatly reduced.

What is claimed is:

1. A self neural net architecture for rate-varying input signals, comprising;

means for sampling a rate-varying input signal, the input signal having an initial duration, the means for sampling having an input and an output, the input of the means for sampling receiving the rate-varying input signal, the means for sampling outputting a sampled signal pattern;

means for time-scaling the sampled signal pattern, the means for time-scaling having an input and an output, the input of the means for time-scaling being coupled to the output of the means for sampling, the means for time-scaling producing a scaled signal pattern;

a feature map for comparing the scaled signal pattern to a stored signal pattern, the feature map having an input and an output, the input of the feature map being coupled to the output of the means for time-scaling; and means for determining a correct match between the scaled signal pattern and the stored signal pattern, the means for determining a correct match having an input and an output, the input of the means for determining a correct match being coupled to the output of the feature map, the output indicating the realization of a correct match as appropriate.

2. The neural net architecture of claim 1, wherein the means for sampling comprises an analog-to-digital converter which generates digital samples of the rate-varying input signal.

3. The neural net architecture of claim 2, wherein the means for sampling further comprises a fast Fourier transform circuit coupled to the analog-to-digital converter such that the fast Fourier transform circuit receives the digital samples, the fast Fourier transform circuit transforming the digital samples from the time domain to the frequency domain.

4. The neural net architecture of claim 1, wherein the means for time-scaling comprises:

an interpolator, which expands the duration of the sampled signal pattern;

a low-pass filter which smooths the sampled signal pattern received from the interpolator; and a decimator which compresses the time duration of the sampled signal pattern received from the low-pass filter, producing a scaled signal pattern whose net scaling is a function of the ratio of the time expansion by the interpolator to the time compression by the decimator.

5. A neural net architecture which provides for the recognition of an input signal which is a rate variant of a learned signal pattern; comprising:

an analog-to-digital converter which creates a digital sampling of the input signal, the digital sampling having an initial duration;

a plurality of interpolators which expand the duration of the digital sampling by at least a first factor, each one of the plurality of interpolators outputting an expanded digital sampling;

a plurality of low-pass filters, each one of the plurality of low-pass filters corresponding to one of the plurality of interpolators, each one of the plurality of low-pass filters serving to smooth the expanded digital sampling output by the corresponding one of the plurality of interpolators;

a plurality of decimators, each one of the plurality of decimators corresponding to one of the plurality of low-pass filters, each one of the plurality of decimators serving to compress the duration of the expanded digital sampling smoothed by the corresponding one of the plurality of low-pass filters by at least a second factor, resulting in a plurality of scaled digital samplings;

a feature map which contains a plurality of learned signal patterns, to which the plurality of scaled digital samplings are compared, the feature map outputting a plurality of values representing how well each of the plurality of scaled digital samplings match each of the plurality of learned patterns; and a comparator for determining which one of the plurality of values is greatest, thus indicating a best match between the input signal and one of the plurality of learned signal patterns.

6. The neural net architecture of claim 5 wherein a fast Fourier transform circuit transforms the digital sampling generated by the analog-to-digital converter from a time domain representation of the input signal to a frequency domain representation of the input signal prior to expansion by the plurality of interpolators.

7. A method for enabling a neural net feature map to recognize an input signal which is a rate variant of a learned signal pattern; comprising:

sampling the input signal with an analog-to-digital converter, the sampled signal having an initial duration;

scaling the duration of the sampled signal by a scaling ratio by means of a method for scaling, comprising:

expanding the time duration of the sampled signal by a first factor by means of an interpolator;

filtering the expanded signal by means of a low-pass filter;

compressing the time duration of the expanded signal by a second factor by means of a decimator, providing a scaled signal, the scaling ratio being the ratio of the first factor to the second factor;

comparing the scaled signal to learned signal patterns stored in the neural net feature map; and selecting the learned signal pattern from the neural net feature map which most closely matches the scaled signal.

* * * * *

UNITED STATES PATENT AND TRADEMARK OFFICE
CERTIFICATE OF CORRECTION

PATENT NO. : 5,220,640

DATED : June 15, 1993

INVENTOR(S) : Mark Frank

It is certified that error appears in the above-indentified patent and that said Letters Patent is hereby corrected as shown below:

Column 3, claim 1, line 64, delete "self".

Signed and Sealed this

Twenty-eighth Day of November 1995

Attest:

BRUCE LEHMAN

*Attesting Officer*   *Commissioner of Patents and Trademarks*